(12) United States Patent  
Sonobe

(10) Patent No.: US 9,374,472 B2  
(45) Date of Patent: Jun. 21, 2016

(54) RELAYING DEVICE

(71) Applicant: Icom Incorporated, Osaka (JP)

(72) Inventor: Hirotaka Sonobe, Osaka (JP)

(73) Assignee: Icom Incorporated, Osaka (JP)

( * ) Notice: Subject to any disclaimer, the term of this patent is extended or adjusted under 35 U.S.C. 154(b) by 177 days.

(21) Appl. No.: 14/102,978

(22) Filed: Dec. 11, 2013

(65) Prior Publication Data

US 2014/0177516 A1     Jun. 26, 2014

(30) Foreign Application Priority Data

Dec. 26, 2012   (JP) ................................. 2012-283576

(51) Int. Cl.
*H04M 7/00*     (2006.01)
*H04B 3/36*     (2006.01)

(52) U.S. Cl.
CPC ....... *H04M 7/006* (2013.01); *H04B 3/36* (2013.01)

(58) Field of Classification Search
None
See application file for complete search history.

(56) References Cited

U.S. PATENT DOCUMENTS

| 7,484,240 | B2 * | 1/2009 | Faccin et al. ............... 726/4 |
| 2010/0008285 | A1 * | 1/2010 | Kuroda ................ 370/315 |
| 2011/0199959 | A1 * | 8/2011 | Fukuzawa et al. ............. 370/315 |

FOREIGN PATENT DOCUMENTS

| JP | 2011-135289 A | 7/2011 |
| JP | 2011-135290 A | 7/2011 |
| JP | 2011-135291 A | 7/2011 |

\* cited by examiner

*Primary Examiner* — Ian N Moore
*Assistant Examiner* — Brian T Le
(74) *Attorney, Agent, or Firm* — Muncy, Geissler, Olds & Lowe, P.C.

(57) ABSTRACT

The present invention relates to a relaying device which performs the individual calling in response to not only a call incoming from a telephone but also a call incoming from a transceiver. When receiving a communication request from another device over a network, the relaying device determines if this communication request is accompanied by the wireless-device specifying information (ID). When the communication request is not accompanied by the ID, the relaying device sends a signal for prompting another device to input the ID. When the ID is sent in response to the sent signal, the relaying device instructs the relaying wireless device to call the wireless terminal device specified by this ID. In addition, when the communication request is accompanied by the ID, the relaying device instructs the relaying wireless device to call the wireless terminal device specified by this ID.

1 Claim, 4 Drawing Sheets

| local station ID | 0001 |
| A group to which the local station pertains | 02, 03 |

| | 200 |
|---|---|
| local station IP address | |
| local station telephone number (URI) | 201 |

CONNECTION INFORMATION TABLE 202

| communication-partner specifying information | connection information | | |
|---|---|---|---|
| | type of calling | ID | IP address |
| *1 | individual | *0002 | 192.168.0.zz |
| *2 | individual | *0003 | 192.168.0.vv |
| #1 | group | #01 | 192.168.0.xx |
| #2 | group | #02 | 192.168.0.yy |

WIRELESS-DEVICE NUMBER TABLE 203

| ID | type of calling | wireless-device number |
|---|---|---|
| *0001 | individual | 11 |
| *0002 | individual | 12 |
| #01 | group | 21 |
| #02 | group | 22 |
| 0000 | local station | request of a second dial |

Fig. 4

RELAYING DEVICE

BACKGROUND OF THE INVENTION

1. Field of the Invention

The present invention relates to a relaying device which relays communications to a wireless device from another wireless device or a telephone over a network.

2. Description of the Related Art

A relaying device disclosed in Japanese Unexamined Patent Application Publication No. 2011-135290, for example, is proposed which relays communications over a network such as a LAN, so that transceivers in areas where radio waves do not reach each other of the transceivers can perform communications. Moreover, in this system, it is also possible to perform communications between a transceiver and a telephone by relaying the communications with the relaying device.

However, since transceivers communicate with one relaying device in the system described above, one transceiver cannot be specified. Therefore, communication voices relayed by the relaying device can be listened by all the transceivers connected to the relaying device.

Thus, it is considered for the communications to perform the individual calling of a transceiver from the relaying device, in order to prevent other transceivers from intercepting communication contents. The telephone system normally utilizes multiple numbers to dial, such as external number+ extension number. It is also desirable even in the transceiver system to specify an arbitrary transceiver by the dial of multiple numbers. On the other hand, since a wireless device such as a portable transceiver is usually manipulated with one hand and has a small number of buttons, the simple manipulation is desired for the wireless device to quickly perform the individual calling of a communication partner device.

SUMMARY OF THE INVENTION

An object of the present invention is to provide a relaying device that can perform the individual calling in response to both of the call incoming from a telephone and the call incoming from a transceiver.

A relaying device according to the present invention comprises: a wireless device interface to which a relaying wireless device communicating with more than one wireless terminal device is connected; a network interface connected to a data communication network and receiving a communication request and wireless-device specifying information for specifying one of the wireless terminal devices from another device connected to the network; and a control unit connected to the wireless device interface and the network interface. When receiving a communication request from another device, the control unit determines whether the communication request is accompanied by the wireless-device specifying information. When the communication request is not accompanied by the wireless-device specifying information, the control unit sends a signal prompting an input of wireless-device specifying information to above-mentioned another device. After above-mentioned another device sends the wireless-device specifying information, the control unit instructs the relaying wireless device to call the wireless terminal device specified by the information. In addition, when the communication request is accompanied by the wireless-device specifying information, the control unit instructs the relaying wireless device to call the wireless terminal device specified by the information.

The communication request sent from another device may be an INVITE message of SIP protocol. In that case, the wireless-device specifying information may be embedded into a TO header.

According to the present invention, when the communication request is accompanied by the wireless-device specifying information, the individual calling is performed to a wireless terminal device based on this wireless-device specifying information. Therefore, it is possible to establish the communication with a simplified procedure. In addition, when the communication request is not accompanied by the wireless-device specifying information, another device as a communication partner is requested to send the wireless-device specifying information again. Then, the individual calling is performed to a wireless terminal device based on the wireless-device specifying information received due to the request. Therefore, it is possible to receive a communication request having high flexibility for the selection and sending of the wireless-device specifying information.

BRIEF DESCRIPTION OF THE DRAWINGS

FIG. 4 shows a content stored in a storage unit of the relaying device.

DESCRIPTION OF THE PREFERRED EMBODIMENTS

Figure 1:
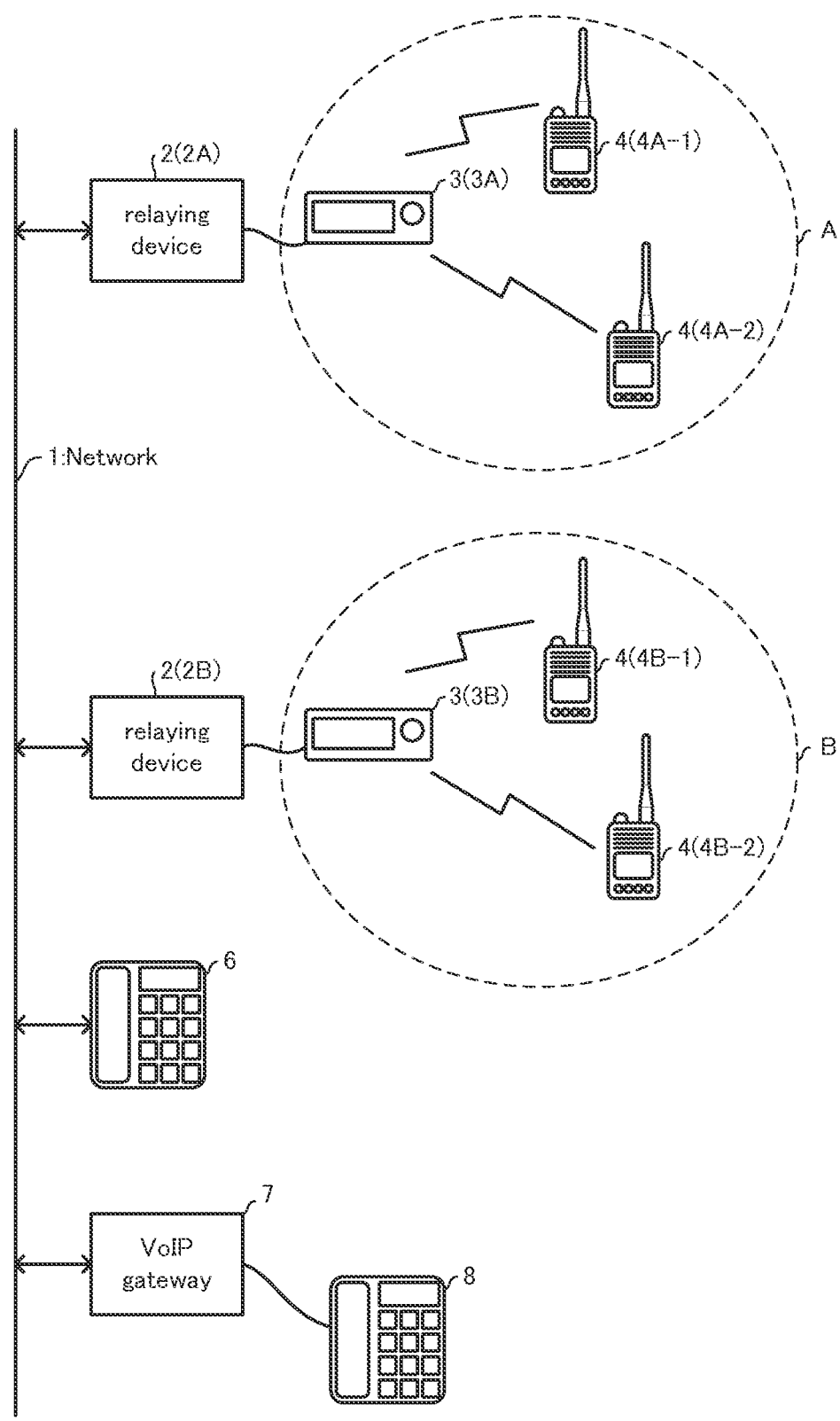
FIG. 1 shows a configuration of a communication system employing a relaying device according to an embodiment of the present invention.

Hereinafter, a description will be given of a communication system including a relaying device according to the present invention, with reference to the accompanying drawings. FIG. 1 is a configuration diagram of the communication system. In this communication system, by means of a relaying device 2, transceivers 4 as the wireless terminal devices can communicate with each other, and the transceivers 4 can communicate with an IP telephone 6 or with a telephone 8.

The network 1 may employ a LAN configured by Ethernet (™), or the Internet. A plurality of the relaying devices 2 (the two relaying devices 2 in FIG. 1) are connected to the network 1. The relaying devices (2A, 2B) respectively cover different communication areas A and B. The repeaters 3 (3A, 3B) are connected to the relaying devices 2. The repeater 3 is a stationary transceiver, which may be a half-duplex communication equipment of a so-called push-to-talk (PTT) type, or may be full-duplex communication equipment which can send and receive simultaneously. One or more (two in drawings) transceivers 4 (4A-1, 2; 4B-1, 2) are present within the communication areas of the repeaters 3.

The repeater 3 and the transceiver 4 are digital transceivers of a type which can communicate with each other. The digital transceivers can wirelessly send and receive an audio signal or data converted into a digital signal. In addition, the digital transceivers can send and receive control information, such as destination information, in parallel with the sending and receiving operations of the audio signal. The repeater 3 packetizes a digital signal received from the transceiver 4, and then not only inputs the packetized signal into the relaying device 2 but also extracts an audio signal or control information from packets input from the relaying device 2 so as to convert the extracted audio signal or control information into time-based digital signals and to send them. The repeater 3 corresponds to the relaying wireless device of the present invention, and the transceiver 4 corresponds to the wireless terminal device of the present invention.

The IP telephone 6 and a VoIP gateway 7 are connected to the network 1. The telephone 8 is connected to the VoIP gateway 7. The VoIP gateway is a gateway device which relays the VoIP (Voice over Internet Protocol) procedure for transferring audio signals through the network 1 to the telephone 8 as a voice communication device.

The following embodiment explains the case that the IP telephone 6, the telephone 8, or the transceiver 4B-1 or 4B-2 sends the communication request to the relaying device 2A for communicating with the transceiver 4A-1 or 4A-2.

The relaying device 2 includes a simple SIP-server function, and operates as described below. When a signal received from the transceiver 4 via the repeater 3 includes information of a communication destination, the relaying device 2 sends to a partner device an INVITE message with a TO header which message communication destination is written into. In addition, when an INVITE message is received from another device and the received INVITE message includes wireless-device identification information specifying the transceiver 4, the relaying device 2 makes the repeater 3 call the transceiver 4 specified by this INVITE message. In addition, when the received INVITE message does not include the wireless-device identification information specifying the transceiver 4, the relaying device 2 requests the another device to send the wireless-device identification information (second dial), and makes the repeater 3 call the transceiver 4 specified by the wireless-device identification information sent in response to the request.

Figures 2, 3:
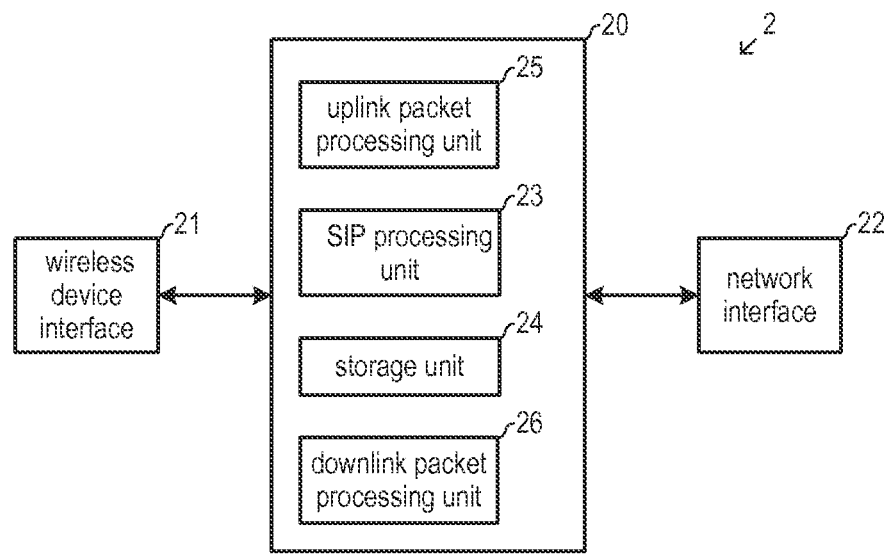
FIG. 2 shows a content stored in a transceiver as a wireless terminal device.
FIG. 3 is a block diagram of the relaying device.

As shown in FIG. 2, the transceiver 4 stores an ID (wireless-device identification information) identifying the local station, and a number for the group to which the local station pertains. When the local station ID or the local station group number is embedded into the received digital signal as the destination information, the transceiver 4 demodulates this digital signal into an audio signal and outputs the audio signal from a speaker or the like. When the local station ID or the local station group number is not embedded in the received digital signal, the transceiver 4 discards this digital signal. It should be noted that the local station ID and the local station group number are inserted, for example, as squelch codes into audio signals received by the transceiver 4.

FIG. 3 is a block diagram of the relaying device 2. FIG. 4 shows a content stored in the storage unit 24. The relaying device 2 includes a control unit 20, and further includes a wireless device interface 21 at the downstream end (at the side of repeater 3) and a network interface 22 at the upstream end (at the side of network 1). Both of the wireless device interface 21 and network interface 22 can employ a connecter for a physical layer of Ethernet or the like, and are associated with a physical layer or a data link layer in digital communications.

The wireless device interface 21 inputs a packet input from the repeater 3 to the control unit 20 and transfers a packet input from the control unit 20 to the repeater 3. The network interface 22 inputs a packet received from another device via the network 1 to the control unit 20 and sends out a packet input from the control unit 20 to the network 1.

The control unit 20 consists of a microcomputer and the like, and functionally includes a SIP processing unit 23, a storage unit 24, an uplink packet processing unit 25 and a downlink packet processing unit 26. A local station IP-address storing area 200, a local station telephone-number storing area 201, a connection information table 202 and a wireless-device number table 203 shown in FIG. 4 are set in the storage unit 24.

The SIP processing unit 23 performs the following processes, in order to allow the transceiver 4 to communicate with another device on the network 1. When receiving a calling request from the transceiver 4 via the repeater 3, the SIP processing unit 23 edits the INVITE message based on the communication-partner specifying information included in this calling request, and sends the edited INVITE message to the partner device.

The connection information table 202 set in the storage unit 24 stores the connection information for connecting with the transceiver 4 (connected to another relaying device 2) which is identified by the communication-partner specifying information. As the connection information for connecting with the transceiver 4 as the communication partner, the connection information table 202 stores the type of calling (group calling or individual calling) and ID for identifying the transceiver 4 as the communication partner. Furthermore, it stores IP addresses of the relaying devices 2 to which the transceiver 4 is connected.

When receiving a calling request from the transceiver 4 via the repeater 3, the SIP processing unit 23 edits the INVITE message with using the connection information corresponding to the communication-partner specifying information included in this calling request. In other word, the SIP processing unit 23 combines the ID and IP address to generate a URI and utilizes it as the destination. This destination is written into the TO header. For example, when the communication-partner specifying information represents "*1" in the connection information table 202 of FIG. 4, the generated URI is "*0002@192.168.0.zz". Therefore, although the transceiver 4 merely sends a simple communication-partner specifying information (e.g., "*1"), the SIP processing unit 23 can edit and send the INVITE message with which the communication partner is directly specified.

In addition, when receiving an INVITE message from the network 1, the SIP processing unit 23 determines which of transceiver 4 among the transceivers 4 under its own control is the target of the calling based on the information of the TO header in the INVITE message. The SIP processing unit 23 reads out a user part (a part front of "@") of the URI written in the TO header. When the user part is not "0000", in other word, when the user part does not specify the relaying device 2 itself, the SIP processing unit 23 utilizes this user part as the ID to search in the wireless-device number table 203 and identifies a corresponding transceiver 4 (wireless device number). The SIP processing unit 23 transfers the wireless device number to the repeater 3, and instructs the repeater 3 to perform the individual calling of the identified transceiver 4. When the user part is "0000" that specifies the relaying device 2, the SIP processing unit 23 replies a request of a second dial (sending ID) to the communication source device, and receives the ID from this device. Then, the SIP processing unit 23 utilizes the received user information as the ID to search in the wireless-device number table 203 and identifies a corresponding transceiver 4. The SIP processing unit 23 instructs the repeater 3 to perform the individual calling of the identified transceiver 4. After then, the SIP processing unit 23 proceeds the SIP procedure, and establishes a communication (call) session.

The uplink packet processing unit 25 performs processes to read out an audio signal from an uplink audio packet input from the repeater 3 via the wireless device interface 21 during the communication session, to convert it into an RTP packet, and to transfer it to the network interface 22. The downlink packet processing unit 26 has a VOX (Voice Operated Relay) function, and monitors a level and duration of an audio signal included in the RTP packet input from the network interface 22 during the call session. When the level and duration of the input audio signal respectively become equal to or more than predetermined thresholds, the downlink packet processing unit 26 determines that an uttered voice is input from a partner device. Then, the downlink packet processing unit 26 converts this RTP packet into an audio packet, in which call information is embedded into an audio signal, and transfers it to the repeater 3. When an audio packet is input from the relaying device 2, the repeater 3 turns on the PTT and sends the audio signal included in this audio packet.

The digital signals, such as the wireless device number and the communication-partner specifying information, transmitted between the repeater 3 and the transceiver 4 are written into a control information area in the intervals between audio signals. In addition, the wireless device number may be written as squelch codes. The digital signals including the written wireless device number are demodulated and reproduced only by the transceiver 4 identified by the included wireless device number. This function is utilized to achieve the individual communication based on the selective call described above.

An example for directly specifying the communication partner by sending an INVITE message, in which the ID of a communication partner is written in the user part of the URI, is described above. However, for directly specifying the communication partner, it may be configured that the user part of the URI is fixed to "0000" specifying the relaying device 2, and that the ID of the communication partner is written into a display name (DN) column of the TO header.

Figure 5:
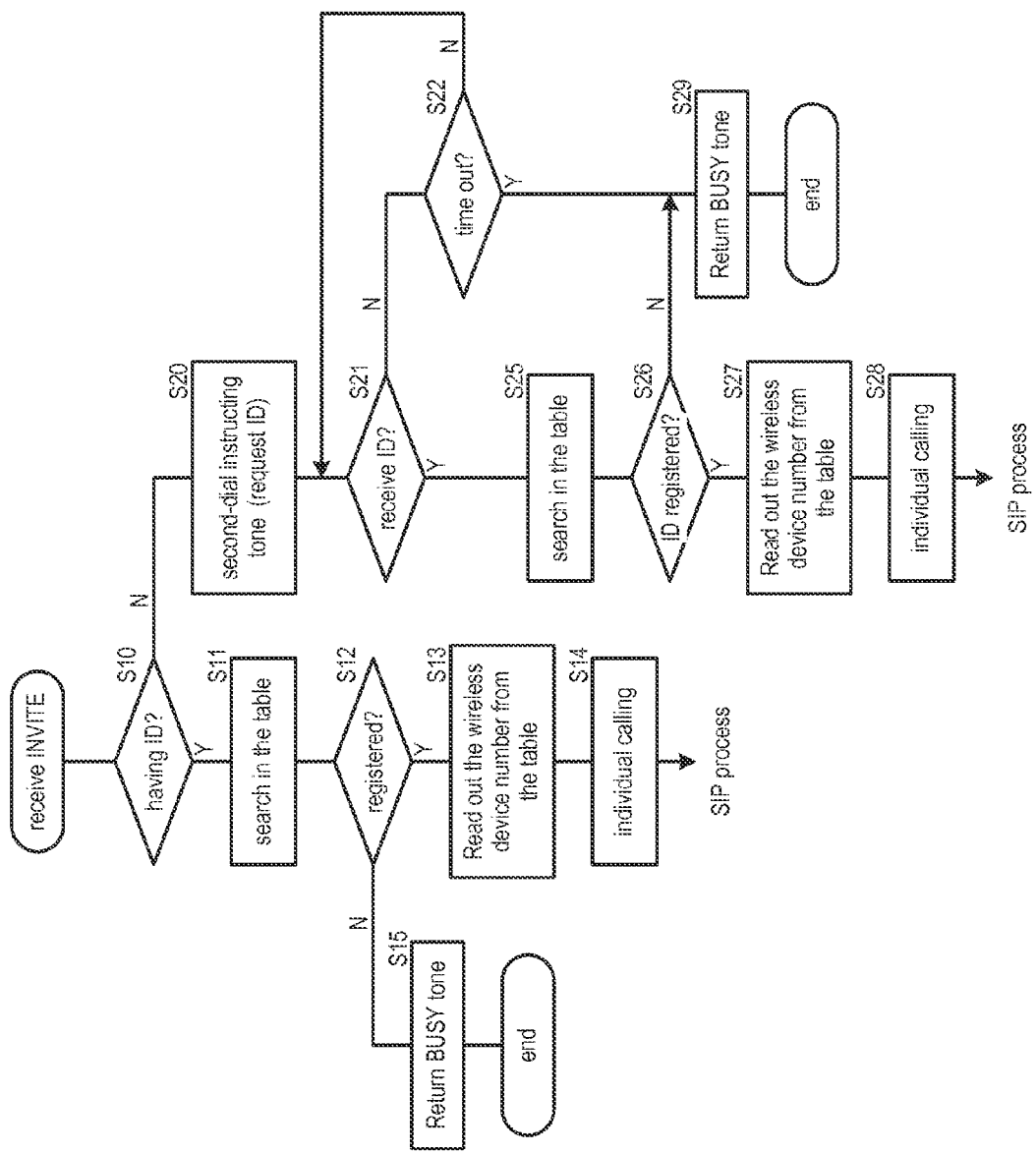
FIG. 5 is a flowchart of an operation of the relying device.

Here, an operation of the relaying device 2 when receiving an INVITE message will be described in reference with a flowchart of FIG. 5. When an INVITE message is received via the network interface 22, the following processes are performed. At first, the control unit 20 determines if the TO header of the received INVITE message includes an ID for specifying a transceiver 4 (S10). When the ID is included in the TO header (YES at S10), the control unit 20 determines that the INVITE message is directly specifying the transceiver 4, and searches in the wireless-device number table 203 (S11). When this ID is registered in the wireless-device number table 203 (YES at S12), the control unit 20 reads out a corresponding wireless device number from the wireless-device number table (S13), transfers this wireless device number to the repeater 3, and instructs to perform an individual calling of the corresponding transceiver 4 (S14). Then, the control unit 20 proceeds the SIP procedure to establish a call session between this transceiver 4 and the communication partner device. When the ID included in the TO header is not registered in the wireless-device number table 203 (NO at S12), the control unit 20 returns "BUSY" to the partner device (S15). Then, the procedure is ended.

On the other hand, when the received INVITE message does not include an ID for specifying a transceiver 4 (NO at S10), the control unit 20 returns a signal (second-dial instructing tone) so as to instruct the partner device to perform a second dial (S20), and prompts the input of second dial, in short, the input of ID. When the ID is sent from the partner device in response to the signal (YES at S21), the control unit 20 searches in the wireless-device number table 203 with this ID (S25). When this ID is registered in the wireless-device number table 203 (YES at S26), the control unit 20 reads out a corresponding wireless device number from the wireless-device number table (S27), transfers this wireless device number to the repeater 3, and instructs to perform an individual calling of a corresponding transceiver 4 (S28). Then, the control unit 20 proceeds the SIP procedure to establish a call session between this transceiver 4 and the communication partner device. When the sent ID is not registered in the wireless-device number table 203 (NO at S26), the control unit 20 returns "BUSY" to the partner device (S29). Then the procedure is ended.

It should be noted that, when a timeout occurs since a certain period of time elapses without the reception of an ID at S21 (YES at S22), the control unit 20 returns "BUSY" (S29). Then, the procedure is ended.

As described above, when the ID for specifying the transceiver 4 is included in the TO header of the INVITE message, the control unit 20 performs the individual calling of the transceiver 4 specified by the ID without requesting the second dial to the partner device. When no ID is included in the TO header of the INVITE message, the control unit 20 requests the second dial to the partner device, and prompts a user of the partner device to input and send the ID again. Therefore, it is possible to call from the portable transceiver 4 with a simple procedure as well as to call from a desktop telephone with high flexibility so as to allow anyone to connect.

It should be noted that the ID and the wireless device number respectively correspond to the wireless-device specifying information of the present invention.

In this embodiment, the telephone number table is utilized for converting the ID into the telephone number. However, if the same type of character string (number sequence) is utilized for the ID and the telephone number, it is possible to directly utilize the ID for calling the transceiver 4 without converting.

In this embodiment, a common table is utilized as the telephone number table for converting the ID included in the TO header into the telephone number and for converting the ID sent by the second dial into the telephone number. However, it may be configured to include different two tables.

REFERENCE NUMERALS 1 network
2 relaying device
3 repeater
4 transceiver
6 IP telephone
7 VoIP gateway
8 telephone

What is claimed is:

1. A relaying device comprising:
    a wireless device interface to which a relaying wireless device is connected, wherein the relaying wireless device communicates with more than one wireless terminal devices;
    a network interface connected to a data communication network and receiving a communication request and wireless-device specifying information for specifying one of the wireless terminal devices from a partner device connected to the data communication network; and
    a control unit connected to the wireless device interface and the network interface, wherein
    the control unit determines whether or not the communication request is accompanied by the wireless-device specifying information, when receiving the communication request,
    when the communication request is not accompanied by the wireless-device specifying information, the control unit sends a signal prompting an input of the wireless-device specifying information to the partner device, and after the partner device sends the wireless-device specifying information in response to the signal, the control unit instructs the relaying wireless device to call the wireless terminal device specified by the wireless-device specifying information, when the communication request is accompanied by the wireless-device specifying information, the control unit instructs the relaying wireless device to call the wireless terminal device specified by the wireless-device specifying information, the communication request is an INVITE message of SIP protocol, and the wireless-device specifying information is embedded into a TO header.

* * * * *